United States Patent
Eubanks et al.

[11] Patent Number: 5,855,271
[45] Date of Patent: Jan. 5, 1999

[54] NOISE AND WEAR REDUCING APPARATUS FOR ENDLESS CONVEYORS

[75] Inventors: Ronald Eubanks, Edgewood; Marcus Hix, Covington, both of Ky.

[73] Assignee: T. K. F., Inc., Cincinnati, Ohio

[21] Appl. No.: 552,724

[22] Filed: Nov. 3, 1995

[51] Int. Cl.⁶ .................................................. B65G 17/16
[52] U.S. Cl. .......................................... 198/799; 267/140
[58] Field of Search .................................. 198/799, 851, 198/475.1; 474/207, 206, 202, 273; 267/140, 153

[56] References Cited

U.S. PATENT DOCUMENTS

| | | | |
|---|---|---|---|
| 2,584,134 | 2/1952 | Knutson | 198/851 X |
| 2,593,324 | 4/1952 | Mann | 198/851 |
| 2,828,002 | 3/1958 | Sawrie | 198/153 |
| 3,024,891 | 3/1962 | Sawrie | 198/154 |
| 3,079,735 | 3/1963 | Freeman | 198/851 X |
| 3,223,260 | 12/1965 | Bright | 198/799 X |
| 3,268,061 | 8/1966 | De Good et al. | 198/153 |
| 3,316,813 | 5/1967 | Wenig | 198/851 X |
| 3,529,732 | 9/1970 | Wayne | 214/6 |
| 3,732,970 | 5/1973 | Nakanishi | 198/154 |
| 3,750,863 | 8/1973 | Dyczynski | 198/189 |
| 3,785,679 | 1/1974 | Peterson et al. | 267/140 X |
| 4,082,338 | 4/1978 | Hutai et al. | 267/140 X |
| 4,267,922 | 5/1981 | Patin et al. | 198/851 |
| 4,627,530 | 12/1986 | Franke | 198/799 |
| 5,263,574 | 11/1993 | Hix | 198/799 |

FOREIGN PATENT DOCUMENTS

| | | | |
|---|---|---|---|
| 514756 | 6/1976 | U.S.S.R. | B65G 17/06 |
| 1276-581-A | 12/1986 | U.S.S.R. | B65G 17/32 |
| 1 446 859 | 8/1976 | United Kingdom | 198/799 |
| 1 571 497 | 7/1977 | United Kingdom | 198/799 |

OTHER PUBLICATIONS

Vertical Systems, Inc., product brochure, "Vertiveyor"; (undated); 3 pages.
Z–LODA Systems Engineering, Inc., products brochure, "Rapid Material Lifts"; (undated); 4 pages.
Standard Conveyor Co., product brochure, "Introducing Escaveyor," Bulletin No. 125; © 1962; 6 pages.
TKF, Inc.; product brochure; "TKF Vertical Conveyors," © 1991; 4 pages.

*Primary Examiner*—Donald W. Underwood
*Attorney, Agent, or Firm*—Porter, Wright Morris & Arthur

[57] ABSTRACT

A conveyor platform is formed from a series of pivotally interconnected segments. Each segment has a stop block, and each stop block has two strike faces. Each strike face abuts against an opposing strike face on adjacent stop blocks when the platform is in a planar position. The stop blocks cannot be compressed, so, when the platform is carrying a load, the stop blocks prevent the platform from sagging. The platform turns as it travels around drive chain sprockets on the return portion of the cyclical drive chain pattern. When it turns, a gap is created between opposing strike faces on adjacent stop blocks. When adjacent segments of the platform emerge from the turn, the opposing strike faces come rapidly together. A bore extends inwardly from one of the strike faces on each stop block and a resilient urethane plug is mounted in the bore. The plug projects slightly beyond the strike face when the opposing strike face on the adjacent stop block is spaced from the plug-bearing strike face. The plug compresses into an enlarged portion of the bore when the opposing strike faces come together. In so doing, the plug cushions the impact between the strike faces, thereby reducing noise and wear.

5 Claims, 4 Drawing Sheets

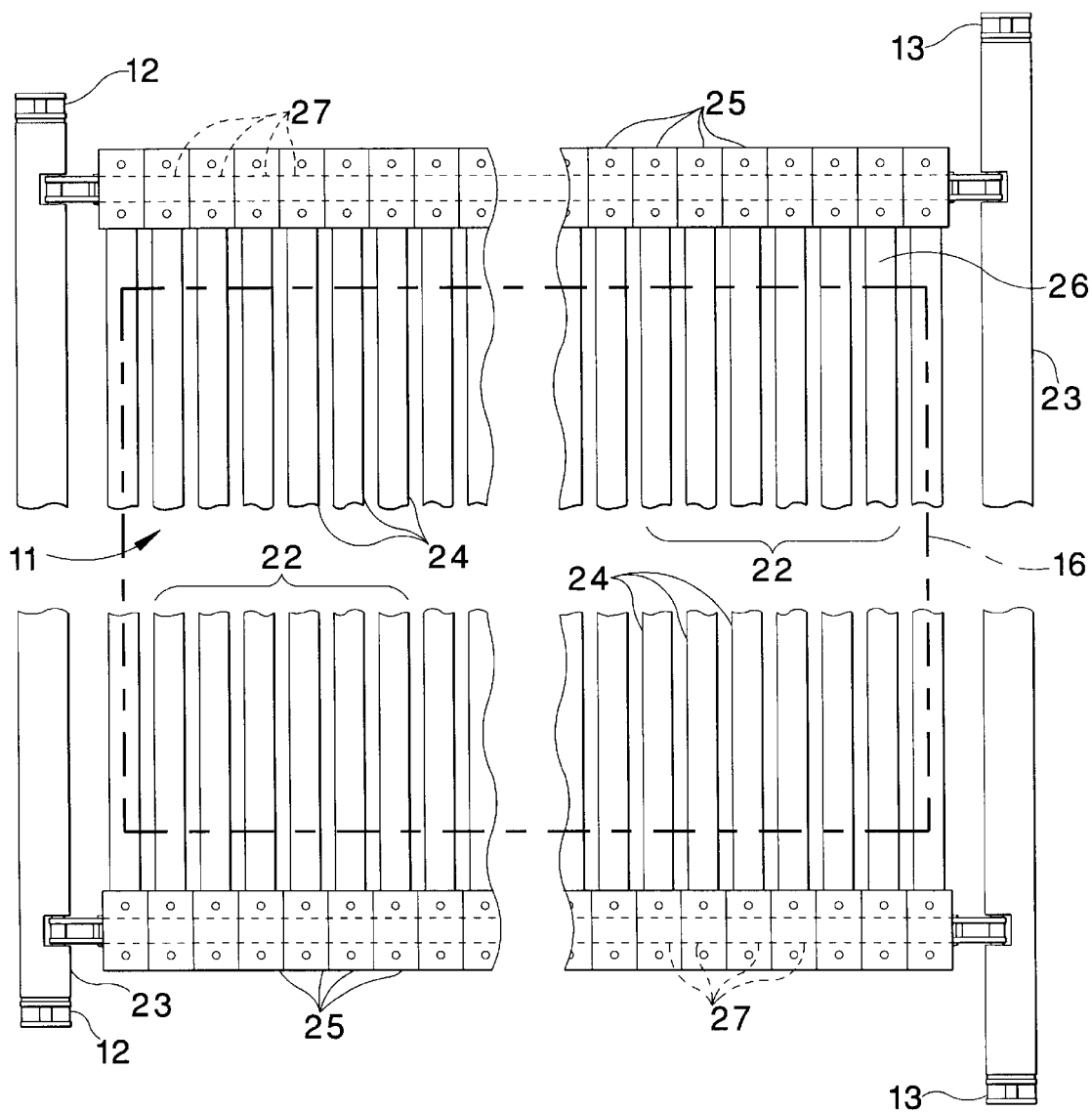

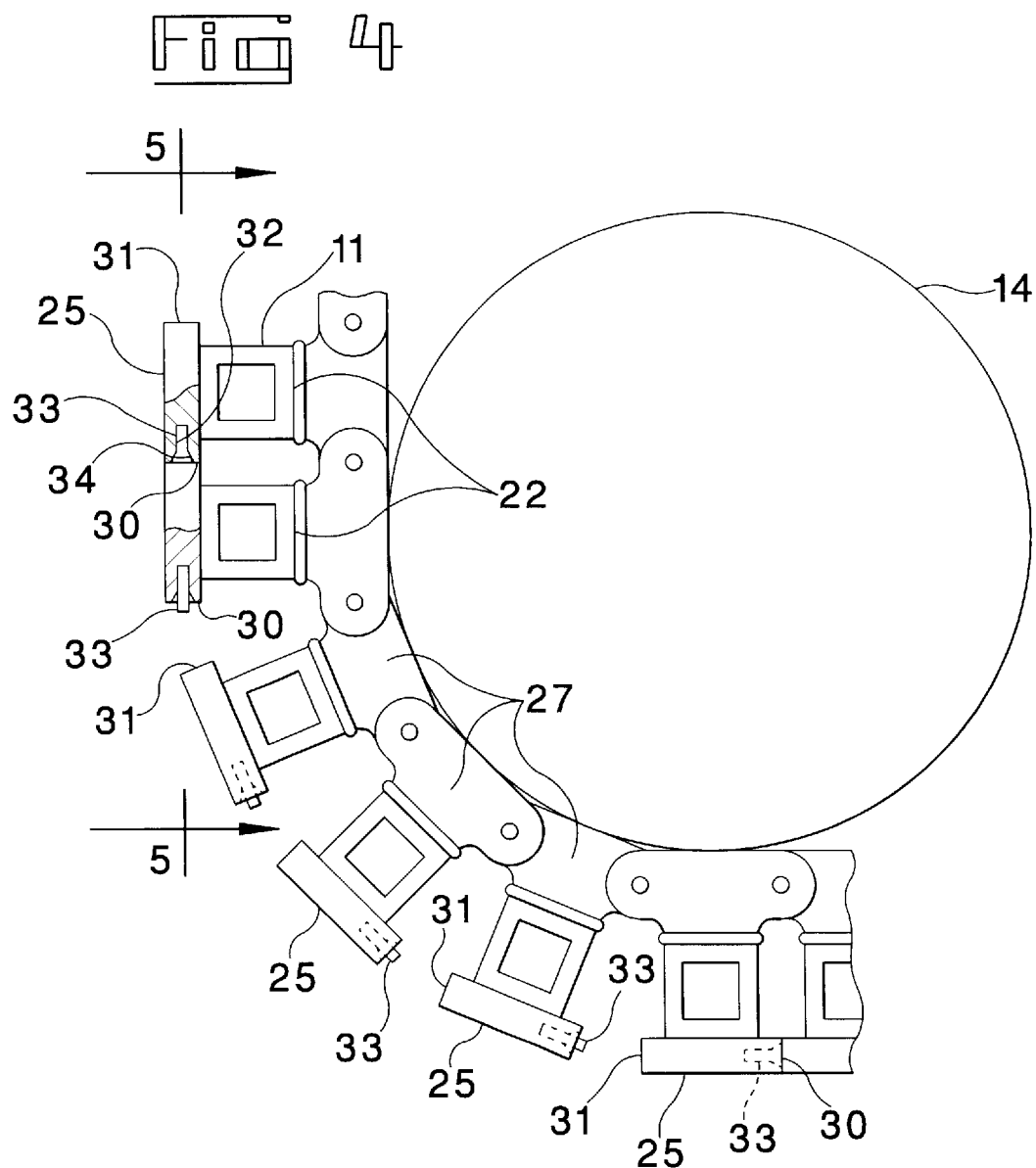

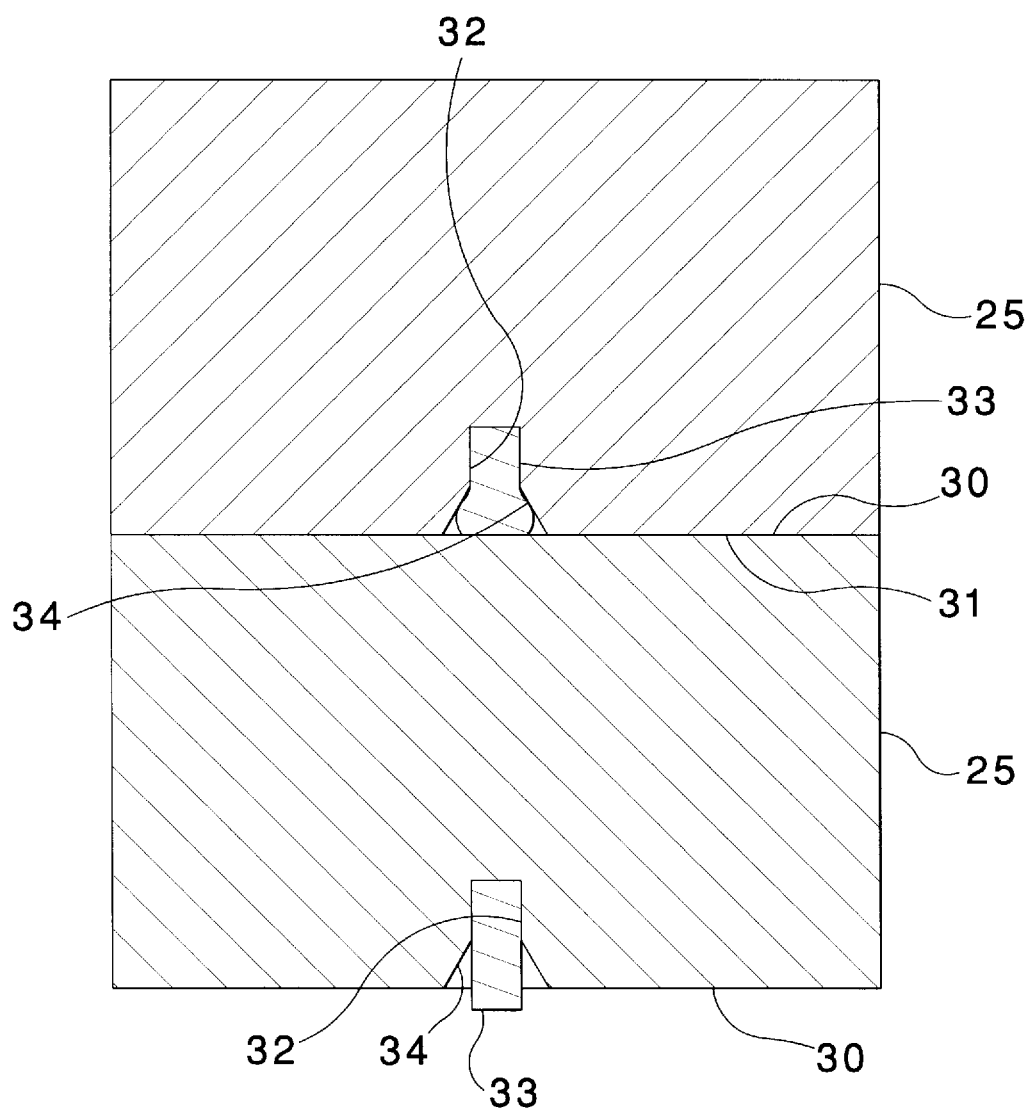

NOISE AND WEAR REDUCING APPARATUS FOR ENDLESS CONVEYORS

BACKGROUND OF THE INVENTION

The present invention relates generally to endless or cyclical conveyors and more particularly to those equipped with self-supporting, load-transporting platforms.

Vertical conveyors and other endless conveyors which move goods in a multi-directional pattern are typically equipped with several relatively spaced apart, load-transporting platforms and with sets of endless drive chains and sprockets which define the cyclical drive chain pattern that the platforms follow. The platform is somewhat like a suspension bridge because it is supported at its opposite ends, but not in the middle, and must not sag appreciably when it is carrying a load. In some ways, the subject platform is more complex than a suspension bridge because the platform carries the load up and/or down and must be able to bend when it follows the chain drives around the sprockets back to a starting position.

In order to be both rigid when carrying a load and flexible when returning to the start, the conventional platform is made up of a series of parallel, laterally extending, interconnected segments. Each segment consists of a long shaft or tube, a pair of stop blocks and a pair of link members. Each of the opposing outer ends of the long shaft is sandwiched between one of the stop blocks and one of the link members. Adjacent segments are pivotally connected together by their link members, and the link members define the turning points which enable the platform to bend as it follows the drive chains around the sprockets. The stop blocks are sized, shaped and positioned so that they engage one another when the platform is in a flat, load-receiving configuration. The stop blocks are substantially incompressible, so, when they come together, they act collectively like a unitary, rigid beam on each side of the platform to stop the platform from sagging under the weight of a load.

The stop blocks separate from one another when the unloaded platform follows the curves defined by the drive chain sprockets. This separation is somewhat like the movement of the outer plates on a metal watchband when the band is being flexed. However, the separation is only momentary, because the platform is moving relatively rapidly through the curve and back into a flat or planar configuration. The angular gap between adjacent segments of the platform closes rapidly, whereupon the incompressible blocks on the adjacent segments strike one another. The rapid re-engagement of the stop blocks creates noise and wear. Since there are many stop blocks on each side of the platform, several curves through which the platform passes on each cycle and several platforms on the vertical conveyor, the noise and wear caused by any two of the stop blocks striking each other are multiplied many times while the conveyor is running.

In the past, the problems of stop block noise and wear were addressed in several ways. One approach was to limit the speed of the conveyor. In this manner, the velocity at which adjacent stop blocks struck one another was low enough to limit noise and wear to acceptable levels. However, this approach was inherently unsatisfactory because the demand for faster vertical conveyors was not being met, even though the conveyor was otherwise capable of operating at higher speeds. Another effort to solve the problem required the alternation of steel and nylotron stop blocks, based upon the expectation that the nylotron would have noise dampening and wear reducing effects. The interposition of nylotron blocks between the steel stop blocks worked well enough when first installed, but the steel blocks wore down the nylotron too quickly. Yet another proposed solution was to inject urethane foam into the hollow transverse tubes of the platform, on the theory that the sound waves generated by the stop blocks clapping together were resonating in the hollow tubes. However, this experiment did not reduce wear, nor did it significantly reduce the noise level.

Thus, the present inventor(s) was/were confronted with the problems of reducing the noise and wear caused by the stop block collisions without limiting the speed, safety and reliability of the conveyor or driving the production and assembly costs excessively high.

SUMMARY AND OBJECTS OF THE INVENTION

The present invention is an improvement in a stop block that is provided with at least one strike face and that is adapted for use in a conveyor platform. The platform comprises at least two segments, and at least one segment is adapted to receive the stop block as a part thereof. The platform is movable between a substantially planar configuration wherein the strike face of the stop block on the one segment abuts against the second segment and a turning configuration wherein the strike face of the stop block on the one segment is spaced from the second segment. The present invention comprises a cavity extending inwardly from the strike face and a cushion which is mountable in the cavity. The cushion is adapted to be resiliently compressible between an extended position wherein a portion of the cushion projects outwardly from the strike face and a compressed position wherein substantially the entire cushion is housed in the cavity.

Primary objects of the present invention are reduction of noise created by the stop blocks, reduction of wear on the stop blocks, desirable conveyor speeds, proper support when the conveyor is carrying a load, acceptable production and assembly costs, and operational safety and durability.

BRIEF DESCRIPTION OF THE DRAWINGS

FIG. 2 is an enlarged plan view taken along line 2—2 of FIG. 1 and particularly illustrates a load-bearing platform on the conveyor;

FIG. 4 is an enlarged, fragmentary view of the platform in a turning configuration; and FIG. 5 is an enlarged, sectional view taken along line 5—5 of FIG. 4 and particularly illustrates the stop blocks on two adjacent segments of the platform.

DETAILED DESCRIPTION OF THE PREFERRED EMBODIMENT

Figure 1:
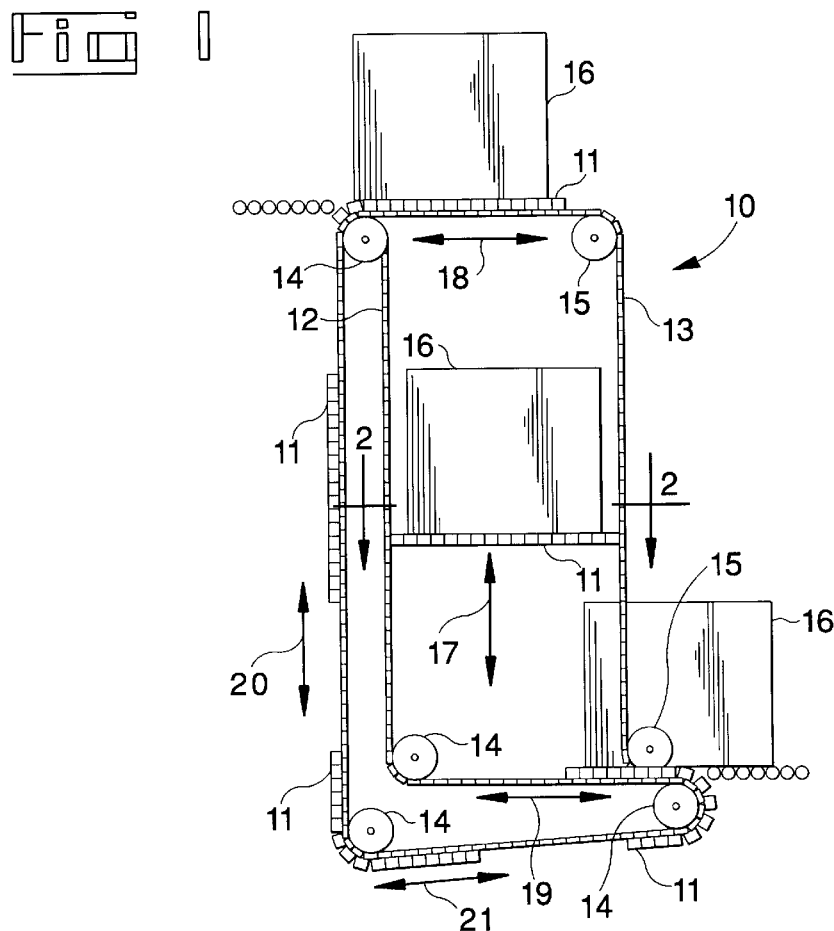
FIG. 1 is a side view of the cyclical drive chain pattern on a vertical conveyor.

As illustrated in FIG. 1, a vertical conveyor, generally designated 10, is equipped with a plurality of load-receiving platforms 11. Each platform 11 is mounted upon two pairs of drive chains 12, 13 (partially shown) which, in combination with two sets of sprockets 14, 15 (partially shown) define a cyclical course or pattern followed by the platform. The direction of travel of the platform 11 depends upon whether the user is moving a load 16 up or down. The cyclical drive chain course comprises a load-bearing portion and a return portion. The load-bearing portion comprises a relatively extended vertical run 17 and relatively short horizontal runs 18, 19 at the top and bottom of the vertical run. Each platform 11 maintains a horizontal configuration in the load-bearing vertical 17 and horizontal 18, 19 runs. The return portion of the cyclical course comprises a vertical run 20 through which the platform 11 is vertically disposed and a horizontal run 21 through which the platform is in an inverted, horizontal position. The platform 11 does not turn as it moves past those of the sprockets 14, 15 associated with the load-bearing portion of the cyclical course, but it does turn as it moves past the sprockets associated with the return portion of the course.

As illustrated in FIG. 2, each platform 11 is comprised of a plurality of segments 22. Each of the outermost segments 22 is pivotally connected to a transversely extending end assembly 23. One of the end assemblies 23 is longer than the other and is attached at opposite ends to one pair of drive chains 12. The shorter end assembly 23 is attached at opposite ends to the other pair of drive chains 13. The platform 11 is not otherwise supported by the pairs of drive chains 12, 13 or by the sets of sprockets 14, 15 or by other portions of the conveyor 10. Thus, the weight of the load 16 is born, in principal part, by the platform segments 22. The end assemblies 23 turn whenever the drive chains 12, 13 turn around the sprockets 14, 15. However, since the two pairs of drive chains 12, 13 are spaced apart in the load-bearing vertical run 17 (FIG. 1) by a distance somewhat greater than the length of the platform 11 and since the end assemblies 23 are pivotally attached to the platform 11, the platform remains in a horizontal position as it travels through the load-bearing vertical run and as it transitions into and out of the upper and lower horizontal load-bearing runs 18, 19. In the return portion of the cyclical course, the two pairs of chains 12, 13 and the associated sets of sprockets 14, 15 are laterally aligned (not shown), so the platform 11 must turn as it enters and emerges from the vertical return run 20 and the inverted return run 21.

Figure 3:
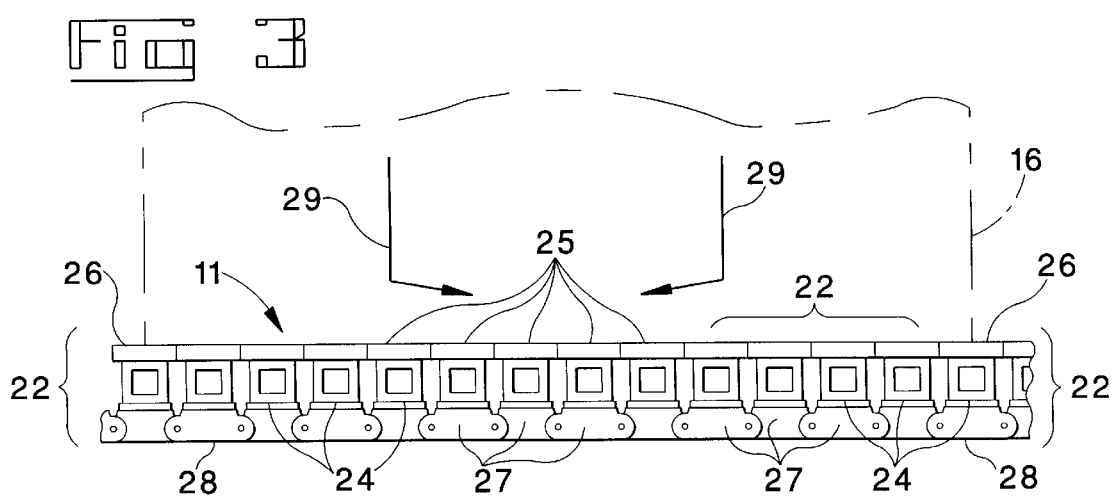
FIG. 3 is a side view of the platform in a planar configuration.

As illustrated in FIGS. 2 and 3, each platform segment 22 includes a transversely extending tube or shaft 24, a pair of relatively spaced apart stop blocks 25 disposed on a load-receiving side 26 of the platform 11 and a pair of relatively spaced apart link members 27 disposed on an interior side 28 of the platform. In this context, the term, "interior side" means the side of the platform 11 which is always facing another portion of the cyclical drive chain pattern, as opposed to meaning facing into the platform. Each of the opposite ends of the tube 24 is sandwiched between, and is rigidly fastened to, one of the stop blocks 25 and one of the link members 27. With respect to the platform 11 as a whole, the link members 27 are arrayed in two laterally spaced apart, longitudinally extending rows, and in each row, the link members are pivotally connected together. Like the link members 27, the stop blocks 25 are collectively disposed in two rows; however, the stop blocks in each row are not interconnected. The link members 27 hold the segments 22 of the platform 11 together and thereby permit the platform to bear the weight of the load 16. However, since the link members 27 are pivotally interconnected, the platform 11 would sag under the weight of the load 16, but for the stop blocks 25. The stop blocks 25 are sized and shaped so that, when the platform 11 is in a substantially planar configuration, as illustrated in FIGS. 2 and 3, the stop blocks in each longitudinally extending row abut against one another. Each stop block 25 is formed from steel or other substantially incompressible material such as Delrin, Nylatron, Polyethylene or other synthetic resins. The load 16 exerts downwardly directed forces 29 upon the platform 11. However, the opposite ends of the platform 11 cannot drop because they are supported by the chain-mounted end assemblies 23. Due to the interconnected link members, the downwardly directed force vectors 29 are at least partially deflected towards the center of the platform 11. In effect, the stop blocks 25 in each row are urged closer together by the weight of the load 16. Since the stop blocks 25 in each row abut against one another when the platform 11 is planar and since the stop blocks are substantially incompressible, the deflected force vectors 29 exerted by the load 16 are overcome by the stop blocks 25 and the link members 27, and the platform 11 does not sag.

As illustrated in FIG. 4, the pivotal connections between the link members 27 and the ability of the stop blocks 25 to separate from one another enable the platform 11 to turn during the return portion of the cyclical drive chain pattern. Each of the stop blocks 25 is provided with a pair of transversely extending strike faces 30, 31. The strike faces 30, 31 define the areas of one stop block 25 which abut against the adjacent stop blocks on opposite sides thereof when the platform 11 is in a planar configuration (FIGS. 2 and 3) or, as illustrated in FIG. 4, when only a portion of the platform is planar. In other words, the strike face 30 of one stop block 25 abuts against the strike face 31 of an adjacent stop block. As the platform segments 22 follow the cyclical chain drive pattern around the sprocket 14 on the return portion of the pattern, the platform 11 turns and the stop blocks 25 in the turning portion of the platform separate from one another. Accordingly, a gap is created between the opposing strike faces 30, 31 on adjacent stop blocks 25.

As illustrated in FIGS. 4 and 5, one of the strike faces 30 on each of the stop blocks 25 is formed with a cavity or bore 32 extending into the stop block. A cylindrical cushion or plug 33 is mounted in the cavity 32 and is formed from durable, resiliently compressible material such as urethane. The plug 33 is longer than the cavity 32 and projects outwardly from the strike face 30 when a gap exists between the opposing strike faces 30, 31 on adjacent stop blocks 25. As the adjacent platform segments 22 exit the turn, the opposing strike faces 30, 31 come rapidly together. At this point, the portion of the plug 33 projecting outwardly from the strike face 30 is compressed by the strike face 31 into a relatively enlarged, counterbored portion 34 of the cavity 32. During this compression, the plug 33 is exerting a counterforce on the strike face 31, and this counterforce reduces the impact between the opposing strike faces 30, 31. Advantageously, the counterbored portion 34 is sufficiently large to receive substantially the entire outwardly projecting portion of the plug 33, so the plug does not prevent the opposing strike faces 30, 31 from actually making contact. Preferably, the diameter of the plug 33 is slightly greater than the diameter of the cavity 32 inwardly of the counterbored portion 34. In this manner, the plug 33 is held within the cavity 32 by a friction fit and may be easily removed and replaced as it becomes worn.

Accordingly, the above-described invention reduces the noise and wear generated or caused when the opposing strike faces 30, 31 on adjacent stop blocks 25 come together. In so doing, the present invention allows the conveyor 10 to be operated at greater speeds. While the beneficial effects of the present invention are substantial, the additions and alterations required to place the invention into operation are minimal, thereby preserving the existing safety, durability and cost effectiveness of the conveyor 10 on which it is installed.

While a single preferred embodiment of the present invention has been illustrated and described in some detail, the foregoing disclosure is not intended to limit unduly the spirit or gist of the invention, nor the scope of the following claims.

What is claimed is:

1. In a stop block provided with at least one strike face and adapted for use in a conveyor platform, said platform comprising at least two segments, at least one segment being adapted to receive the stop block as a part thereof; said platform being movable between a substantially planar configuration wherein the strike face of the stop block on the one segment abuts against the other segment and a turning configuration wherein the strike face of the stop block on the one segment is spaced from the other segment, that improvement which comprises:

a cavity extending inwardly from the strike face of the stop block;

a cushion mounted in the cavity, said cushion being adapted to be resiliently compressible between an extended position wherein a portion of the cushion projects outwardly from the strike face and a compressed position wherein substantially the entire cushion is housed in the cavity; and said cavity being formed with a relatively enlarged area adjacent to the strike face, said relatively enlarged area being adapted to receive the outwardly projecting portion of the cushion.

2. In a conveyor platform comprising at least two adjacent segments, each of said segments having a stop block mounted thereon, each of said stop blocks having first and second strike faces, said platform being movable between a substantially planar configuration wherein the first strike face of the stop block on one segment abuts against the second strike face of the stop block on the adjacent segment and a turning configuration wherein said first strike face of the stop block on the one segment is spaced from said second strike face of the stop block on the adjacent segment, that improvement which comprises:

a cavity extending inwardly from the first strike face on at least one of the stop blocks; and a cushion mounted in the cavity, said cushion being adapted to be resiliently compressible between an extended position wherein a portion of the cushion projects outwardly from the first strike face and a compressed position wherein substantially the entire cushion is housed in the cavity.

3. The conveyor platform according to claim 2, wherein the cushion is a cylindrical plug, said plug being sized to be frictionally and removably mounted in the cavity.

4. The conveyor platform according to claim 2, wherein the cushion is formed from urethane.

5. The conveyor platform according to claim 2, wherein the cavity is formed with a relatively enlarged area adjacent to the first strike face, said enlarged area being adapted to receive the outwardly projecting portion of the cushion.

* * * * *